Jan. 27, 1970  E. D. THOMPSON  3,491,815
BALED FEED MILLS
Filed Sept. 16, 1966  2 Sheets-Sheet 1
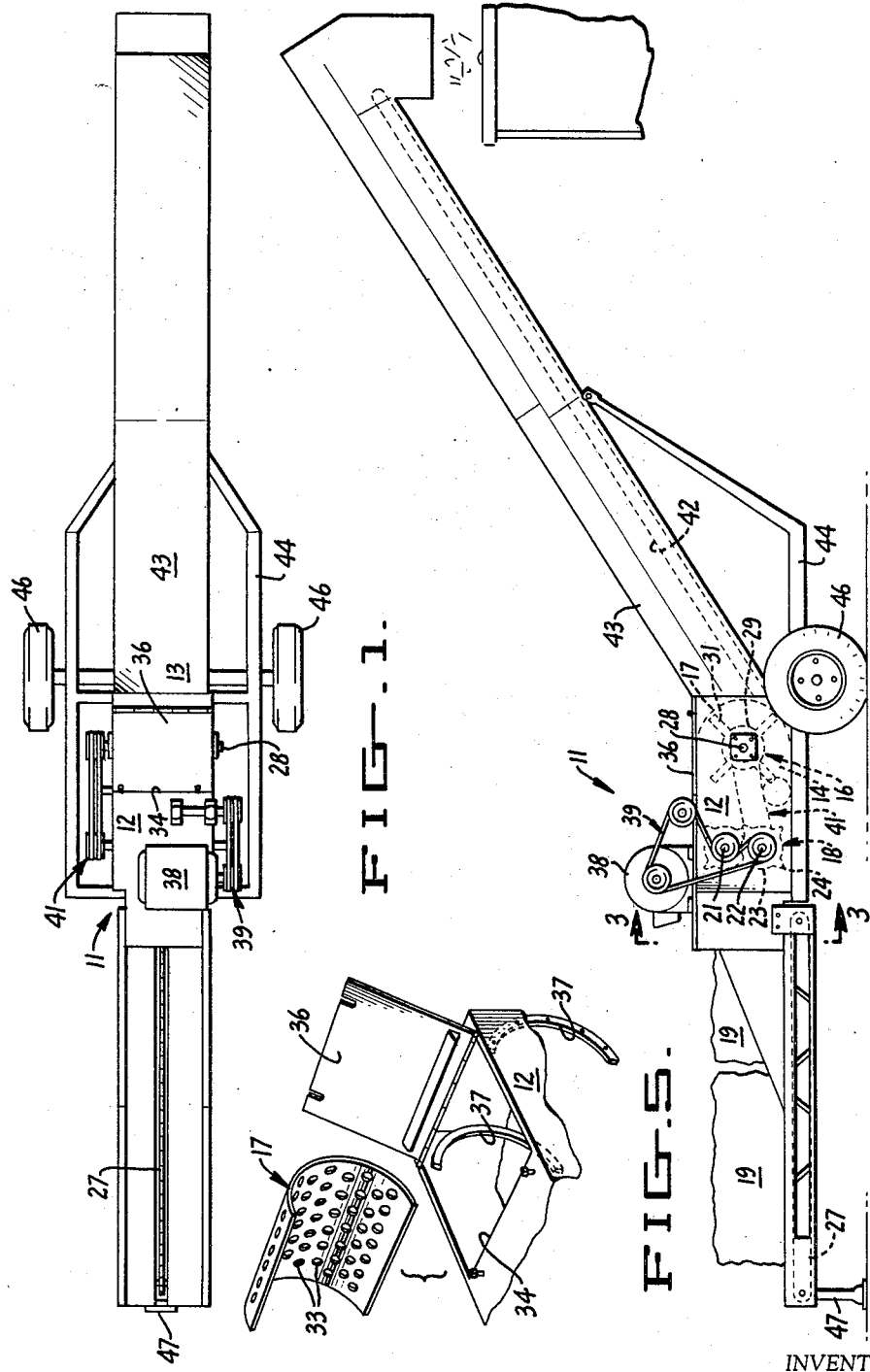
INVENTOR.
EUGENE D. THOMPSON
BY
Schapp & Hatch
ATTORNEYS Jan. 27, 1970  E. D. THOMPSON  3,491,815
BALED FEED MILLS
Filed Sept. 16, 1966  2 Sheets-Sheet 2

INVENTOR.
EUGENE D. THOMPSON
BY
Schapp & Hatch
ATTORNEYS 3,491,815
BALED FEED MILLS
Eugene D. Thompson, 813 Edgebrook Drive,
Modesto, Calif. 95351
Filed Sept. 16, 1966, Ser. No. 580,021
Int. Cl. A01f *29/00, 15/10;* A01d *55/00*
U.S. Cl. 146—70.1                                          8 Claims

ABSTRACT OF THE DISCLOSURE

A baled feed mill comprising a shredder and a hammer-mill mounted in a common housing for a two stage reduction of particle size, with the shredder formed for reduction of baled material into individual segments of relatively uniform size and the hammer-mill cooperative with a screen for second stage reduction into relatively fine uniform particles. The shredder comprises a pair of parallel horizontal rotatable shafts extending across the housing within a vertical plane, said housing having an enlarged passage at the shredder, a plurality of discs on each shaft perpendicularly disposed thereto, with the discs positioned in overlapping relation, and a plurality of cutter blades mounted on each disc. The hammer-mill comprises a rotatable shaft, a plurality of plates normal to the shaft, a plurality of rods mounted on each plate in parallel circumferentially spaced relation and extending between the plates, a hammer pivotally mounted on each rod, with each hammer having a length substantially greater than the radial distance between the shaft and its rod, and a curved screen secured across the housing in proximity to the hammer-mill and cooperative therewith for reducing and classifying particles, said screen being removably mounted for adjustment by substitution of different sized screens.

---

This invention relates to improvements in baled feed mills, and more particularly to apparatus adapted for reducing baled hay to a desired particulate size and stem length.

In the feeding of cattle and the like, it is desirable to chop up and reduce bales of hay or the like into a mass of particles or pieces of desired size so as to provide relatively uniform consistency. The term "baled feed" is used to indicate compressed bales of dried or partially dried hay or hay-like plants. Thus, the term is here intended to encompass various dried grasses and straws, as well as the lucernes and alfalfas more commonly thought of as comprising "hay."

Wide variations in texture, consistency, toughness of stem, moisture content, etc., are encountered in milling baled feeds of the type described. In order to be practical for the average farmer or feeder, the milling device should be capable of achieving the desired results with any of the baled feeds commonly encountered, without shutting down or adjusting the machine. In addition, it should be possible for the operator to vary the consistency of the milled feed by changing the length of the chopped sections of stem in accordance with the type of feeding.

Previous hay mills have been designed to operate efficiently with certain types of baled feeds, but are incapable of achieving good results with other types. For example, partially dried hays and grasses having a relatively high moisture content or wiry stems tend to "clump" in the mill and greatly interfere with milling efficiency. Indeed, clumping has been known to stall feed mills with consequent damage to motors and drive assemblies. Prior machines capable of dealing effectively with clumping have proven to be relatively ineffectual in handling straws and thoroughly dried hays.

The apparatus of the present invention contemplates a two-stage operation in which the baled hay is first cut or shredded into relatively small segments of relatively uniform size. In the second stage, these segments pass through a hammer-mill and cooperative classifier screen which break up and reduce the segments, with the screen acting to pass only particles of the desired size.

It is therefore a principal object of the present invention to provide a hay mill capable of receiving and reducing baled feeds of various types and characteristics to a desired particulate size.

Another object of the present invention is to provide a hay mill of the character described which provides a two-stage operation of first cutting or shredding the bales of feed into fairly uniform segments and passing the segments through a classifying mill which will emit the reduced feed in particles of desired size.

A further object of the present invention is to provide a hay mill of the character set forth in which the particulate size of the milled feed may be quickly and easily varied by the operator of the machine.

Yet another object of the invention is to provide a two-stage hay mill of the character described which is light in weight and fully portable and is adapted for field operations in any desired location.

Other objects and advantages of the present invention will become apparent from the following detailed description and the accompanying drawings, in which:

FIGURE 1 is a plan view of a hay mill made in accordance with the present invention;

FIGURE 2 is a side elevation view of the hay mill of FIGURE 1;

FIGURE 5 is a fragmentary perspective view of a portion of the hay mill and a perforated screen mountable therein.

Figure 3:
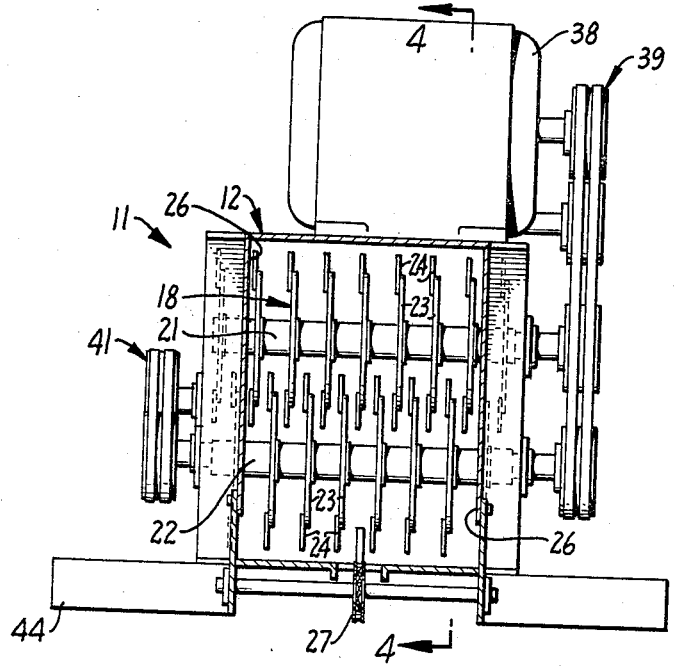
FIGURE 3 is an enlarged vertical cross-sectional view taken substantially on the plane of line 3—3 of FIGURE 2.

While the preferred form of the invention is shown in the accompanying drawings and described herein, it will be apparent that various changes and modifications may be made within the ambit of the invention as defined in the accompanying claims.

Referring to the drawings in detail, it will be seen that the hay mill of the present invention basically comprises a shredder 11 adapted for receiving bales of hay in end-first relation and formed for performing a first stage reduction of such bales into segments of relatively uniform size, a housing 12 mounted around the shredder 11 and having an end portion 13 providing a mill chamber 14 adapted to receive the bale segments from the shredder 11, a hammermill 16 operatively mounted in the chamber 14, and a curved, perforated plate or screen 17 secured across the housing 12 in proximity to the hammermill 16 and cooperative therewith to perform a second-stage reduction of the bale segments into particles of relatively uniform, predetermined size.

The shredder 11 is provided with a plurality of rotary cutters 18 capable of shredding the bale 19 longitudinally to accomplish the described first-stage reduction of the bale into relatively uniform segments. As here shown, the shredder 11 includes a pair of shafts 21 and 22 journaled across the housing 12 in parallel spaced relation to each other. The rotary cutters 18 are provided by a plurality of discs 23 secured to the shafts 21 and 22 in parallel, spaced relation normal to the shafts, the discs 23 on the shaft 21 being off-set midway between the discs on the shaft 22, and a plurality of triangular cutting blades 24 being affixed in equally spaced relation around the periphery of each of the discs 23.

As may best be seen from FIGURE 3 of the drawings, the housing 12 is formed with an opening 26 which is slightly higher and wider than the bales 19. A chain drag conveyor 27 feeds the bales 19 end-first through the opening 26 and into the shredder 18. As the leading end of the bale 19 encounters the whirling rotary cutters 18, the latter slice into the bale and effect the desired longitudinal shredding or segmenting thereof.

Preferably, the housing 12 is somewhat wider than the opening 26 and the shafts 21 and 22 extend laterally beyond the side edges of the opening. Additional rotary cutters 18 are mounted on the shafts 21 and 22 outboard of the sides of the opening 26. This configuration takes care of expansion of the bale as it is sliced into by the cooperating rotary cutters, it being noted that the shafts 21 and 22 are rotated in opposite directions in such manner that the cutting blades 24 rotate toward each other on the side of the shredder confronting the opening 26. This materially lessens any tendency of the bale to break apart and clump between the shredder 18 and the walls of the housing 12.

The segmented bale passes from the shredder 18 into the mill chamber 14 where it encounters the whirling hammermill 16. As here shown, the hammermill includes a shaft 28 journaled across the housing 12 and having a plurality of circular plates 29 secured thereto in parallel spaced relation normal to the shaft. A plurality of equally spaced, swinging hammers 31 are pivotally mounted on a plurality of rods 32 extending in parallel, circumferentially-spaced relation between the plates 29. In this connection, it has been found that an improved action results if the length of the hammers 31 is greater than the radial distance between the centers of the shaft 28 and the rods 32 upon which the hammers 31 are pivoted.

The hammermill 16 cooperates with the perforated curved plate or screen 17 to perform a second-stage reduction of the bale segments coming from the shredder 18 into particles or pieces of relatively uniform, predetermined size. As may be seen from FIGURE 4 of the drawings, the perforated plate 17 is proportioned and mounted adjacent to the path of travel described by the tips of the hammers 31, approximately one-half inch spacing been found to be suitable for the purposes of this invention.

The size of the perforations 33 determines the particle size and stem length of the feed passing through the screen 17. The cooperation between the first stage shredding and the second stage milling actions makes it possible to achieve a high output of milled feed from a wide variety of types of bales and with remarkable uniformity of the end product.

In accordance with the present invention, it is possible for the operator to change the particle size and stem length for different feeding purposes. This is accomplished in a rapid and simple manner in the present device by providing a plurality of screens 17 having different sized perforations and making these screens readily removable and replaceable in the unit.

Figure 4:
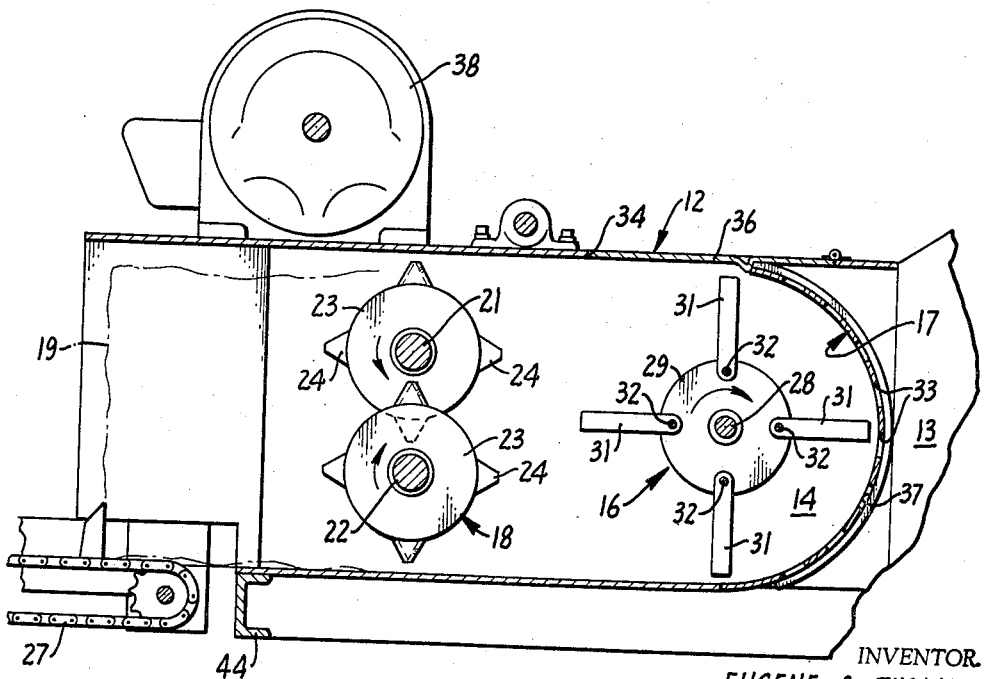
FIGURE 4 is an enlarged vertical sectional view taken substantially on the plane of line 4—4 of FIGURE 3.

As can be seen in FIGURE 4 of the drawings, the screen 17 is inserted into and removed from the housing 12 through a top opening 34 which is normally closed off by a hinged lid 36. When it is desired to install a screen 17 into the unit, and lid 36 is opened and the previous screen removed. The desired screen 17 is then set into place and the lid 36 is closed, the lid 36 in closed position cooperating with an abutment 37 provided inside the housing 12 to firmly retain the screen 17 in the desired position.

As a feature of the invention, the present device is light in weight, compact, and readily lends itself to being made portable so it can be used at any desired location in the field. The unit is here driven by an electric motor 38 and drive belt and sheave assembly 39, which effect the described counter-rotation of the shredder shafts 21 and 22. A second drive belt and sheave assembly 41 connects the hammermill 16 to the shredder 18 to be driven thereby.

Of course, other drive means can be employed. For example, the drive motor may be replaced with a gasoline or diesel engine, or the unit may be driven by a power take-off from a tractor or other implement (not shown) in the conventional manner.

Preferably, the unit is provided with a load-out conveyor 42 capable of receiving the milled feed and moving it to an elevated discharge point. As here shown, the load-out conveyor 42 consists of a hay-drag flight conveyor enclosed in an extension 43 of the housing 12.

The entire unit is preferably mounted on a light-weight chassis 44 provided with farm implement-type tires 46 and a draw bar 47 which also provides the frame for the bale conveyor 27. With this construction, the entire unit can be hooked to and towed behind a pickup truck or tractor (not shown) to any desired location, thus greatly increasing its versatility and usefulness to the farmer or feeder.

From the foregoing, it will be apparent that the hay mill of the present invention provides a novel and useful apparatus for effecting a two-stage reduction of baled feeds to a desired particulate size in a light-weight, compact and fully portable unit providing wide versatility as to character of baled feeds, particulate size and character of milled feed, and location of use.

I claim:

1. A mill for reducing baled hay to a desired particulate size, comprising a shredder formed for receiving bales of hay in end-first relation and adapted for performing a first-stage reduction of each bale into segments of relatively uniform size, a housing mounted around said shredder and having an end portion providing a mill chamber adapted to receive said segments from said shredder, a hammermill operatively mounted in said chamber, and a curved screen secured across said housing n proximity to said hammermill and cooperative therewith to perform a second stage reduction of said segments into particles of relatively uniform predetermined size; said shredder comprising a pair of shafts journalled across said housing in parallel spaced relation, a plurality of discs normal to said shafts and secured thereto in parallel spaced relation, with the discs on one shaft offset midway and extending between the discs on the other shaft, and a plurality of triangular cutting blades affixed in equally spaced relation around the periphery of each of said discs.

2. A mill as described in claim 1 and wherein said housing is supported on a trailer chassis, and an enclosed flight conveyor extends on an upward incline from said end portion.

3. A mill as described in claim 1 and wherein said hammer-mill comprises a shaft journaled across said housing, a plurality of plates normal to said shaft and secured thereto in parallel spaced relation, a plurality of rods secured to and extending between said plates in parallel circumferentially-spaced relation, and a plurality of hammers pivotally mounted in parallel spaced relation on each of said rods, said hammers having a length substantially greater than the radial distance between said shaft and said rods.

4. A mill as described in claim 1 and wherein a plurality of said curved screens is provided, with each curved screen having perforations of different size, and mounting means is provided for selectively mounting the curved screens in operative position in said housing whereby the size of said particles may be varied as desired.

5. A mill as described in claim 4 and wherein said mounting means comprises a hinged lid on said end portion of said housing, and an abutment on the interior of said housing cooperative with said lid when the latter is in closed position to secure said curved plate in operative position.

6. A mill as described in claim 1 and wherein means is provided for rotating said shafts in opposite directions so that said blades rotate toward each other on the side of the shredder confronting said opening and carry the hay or the like between the shafts.

7. A mill as described in claim 1 and wherein a feed conveyor is operatively connected to said shredder for feeding the bales end-first into the shredder in a direction normal to a plane coincident with the axes of said shafts.

8. A mill as described in claim 6 and wherein said housing is formed with an opening sized and positioned to receive the bales on said feed conveyor, and said shafts and discs extend laterally across and to both sides of said opening whereby the passage in the housing is enlarged at the shredder.

References Cited

UNITED STATES PATENTS

| | | | |
|---|---|---|---|
| 537,764 | 4/1895 | Gillet | 146—70.1 |
| 1,645,770 | 10/1927 | Olson | 241—88 X |
| 2,095,584 | 10/1937 | Wilkins | 241—88 |
| 2,125,352 | 8/1938 | MacDonald | 241—89 |
| 2,505,023 | 4/1950 | Williamson | 241—86 |
| 2,685,900 | 8/1954 | Cross | 146—70.1 |
| 2,889,862 | 6/1959 | Williamson | 146—70.1 X |
| 3,039,505 | 6/1962 | Mast | 146—119 |

W. GRAYDON ABERCROMBIE, Primary Examiner

U.S. Cl. X.R.

146—119; 241—186